US011946295B2

(12) United States Patent
Jarnicki et al.

(10) Patent No.: US 11,946,295 B2
(45) Date of Patent: Apr. 2, 2024

(54) DOOR HANDLE ARRANGEMENT

(71) Applicant: Witte Automotive GmbH, Velbert (DE)

(72) Inventors: Richard-Roman Jarnicki, Velbert (DE); Reinaldo Mensch, Wuppertal (DE); Markus Richter, Velbert (DE)

(73) Assignee: Witte Automotive GmbH, Velbert (DE)

( * ) Notice: Subject to any disclaimer, the term of this patent is extended or adjusted under 35 U.S.C. 154(b) by 334 days.

(21) Appl. No.: 16/875,127

(22) Filed: May 15, 2020

(65) Prior Publication Data

US 2020/0362604 A1 Nov. 19, 2020

(30) Foreign Application Priority Data

May 17, 2019 (DE) ..................... 10 2019 113 130.8

(51) Int. Cl.

| | |
|---|---|
| ***E05B 81/76*** | (2014.01) |
| ***E05B 81/20*** | (2014.01) |
| ***E05B 81/78*** | (2014.01) |
| ***E05B 85/18*** | (2014.01) |

(52) U.S. Cl.

CPC .............. *E05B 81/78* (2013.01); *E05B 81/20* (2013.01); *E05B 81/76* (2013.01); *E05B 81/77* (2013.01); *E05B 85/18* (2013.01)

(58) Field of Classification Search

CPC .......... E05B 81/76; E05B 81/77; E05B 81/78; E05B 85/10; E05B 85/14; E05B 85/16; E05B 85/18; Y10T 292/57

See application file for complete search history.

(56) References Cited

U.S. PATENT DOCUMENTS

| | | | | |
|---|---|---|---|---|
| 9,556,655 | B2 * | 1/2017 | Shimizu | E05B 81/76 |
| 10,174,529 | B2 * | 1/2019 | Saitou | H01H 13/06 |
| 10,982,469 | B2 * | 4/2021 | Frattini | G01V 3/00 |

(Continued)

FOREIGN PATENT DOCUMENTS

| | | |
|---|---|---|
| CN | 207633911 U | 7/2018 |
| DE | 19961360 A1 | 7/2001 |

(Continued)

OTHER PUBLICATIONS

German Patent and Trademark Office, Search Report in Application No. DE102019113130.8, 8 pages, Munich Germany.

(Continued)

*Primary Examiner* — Christine M Mills
*Assistant Examiner* — Noah Horowitz
(74) *Attorney, Agent, or Firm* — Marshall & Melhorn, LLC

(57) ABSTRACT

A door handle assembly (1), such as an outer door handle arrangement for a vehicle including at least one vehicle movable element may have the following elements. A handle element having a handle recess. A handle cover, which may at least partially covers the handle recess. An actuating unit, which may be arranged between the handle element and the handle cover. A carrier unit including at least one sensor and at least one switch for opening a door lock. Where the carrier unit is designed to unlock the door lock when an object situated in a detection area of the sensor is detected. The actuating unit being designed to press the switch during a manual actuation.

16 Claims, 9 Drawing Sheets

(56) References Cited

U.S. PATENT DOCUMENTS

Figure 1:
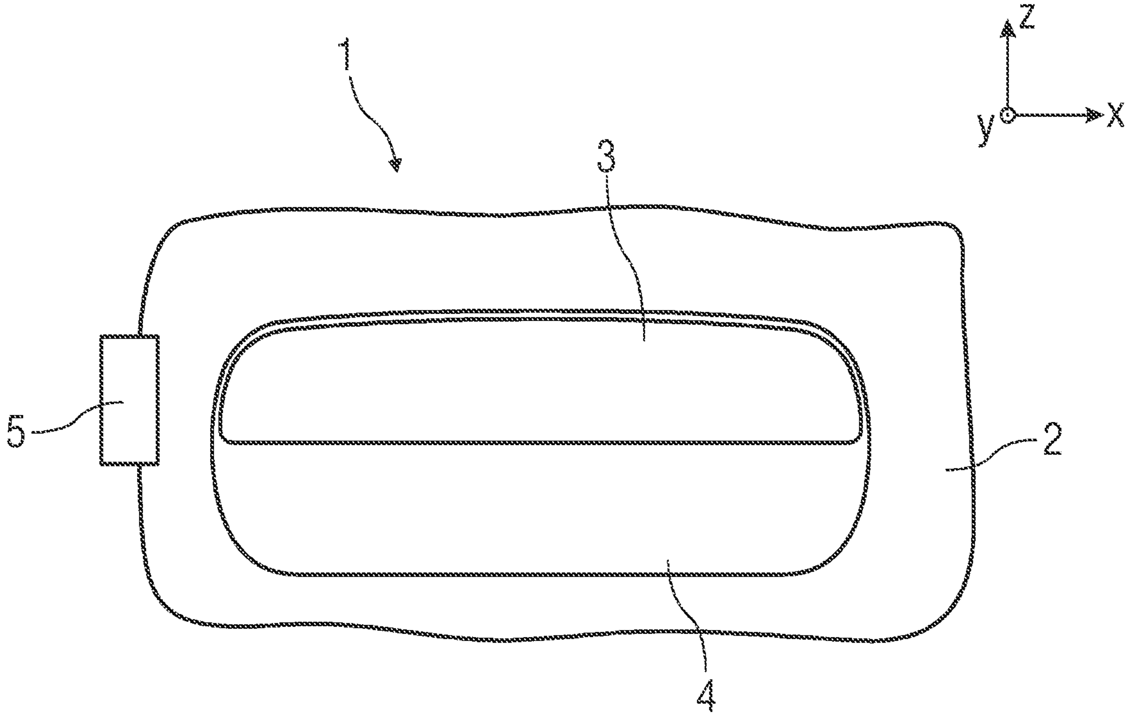

| | | | | |
|---|---|---|---|---|
| 11,174,663 | B2 * | 11/2021 | Gerber .................... | E05B 81/90 |
| 2020/0123819 | A1 * | 4/2020 | Müller .................... | E05B 79/06 |
| 2020/0270915 | A1 * | 8/2020 | Yoshino .................. | E05B 81/78 |
| 2021/0025203 | A1 * | 1/2021 | Bendel .................... | E05B 81/90 |

FOREIGN PATENT DOCUMENTS

| | | | | |
|---|---|---|---|---|
| DE | 10132925 A1 | 1/2003 | | |
| DE | 102006029774 A1 | 1/2008 | | |
| DE | 102015100074 A1 | 3/2016 | | |
| EP | 1108834 A2 | 6/2001 | | |
| EP | 1476623 B1 | 11/2006 | | |
| EP | 1023511 B2 | 4/2007 | | |
| JP | H09250265 A | 9/1997 | | |
| WO | WO-2017129333 A1 * | 8/2017 | ............. | E05B 81/76 |

OTHER PUBLICATIONS

China National Intellectual Property Administration—Office Action in Application No. 202010417889.9, dated Mar. 15, 2021, 7 pages.

European Patent Office—Search Report in Application No. EP20173127, dated Oct. 5, 2020, 7 pages.

* cited by examiner

DOOR HANDLE ARRANGEMENT

The invention relates to a door handle arrangement, in particular, an outer door handle arrangement for a vehicle.

Door handle arrangements are known, for example, on vehicle doors, tailgates or engine hoods. These are usually provided with a handle element which may be pivoted outwards in order to be able to open the vehicle door, the tailgate or the engine hood.

The object of the invention is to specify an improved door handle arrangement compared to the prior art, which is of compact construction and, in particular, enables a simplified unlocking of a door lock and a simplified opening of the door lock, for example, of an electromechanical door lock for a movable vehicle element, in particular, a vehicle door.

The object is achieved according to the invention with the features specified in claim 1.

The door handle arrangement according to the invention, in particular, an outer door handle arrangement for a vehicle having at least one movable vehicle element, comprises at least one handle element having a handle recess and a handle cover that at least partially covers the handle recess. The door handle arrangement further comprises at least one actuating unit, which is arranged between the handle element and the handle cover, and a carrier unit which includes at least one sensor and at least one switch. For example, the switch is designed to open a door lock of the movable vehicle element. When an object located in a detection area of the sensor is detected, the carrier unit unlocks a door lock, wherein after the door lock is unlocked, the actuating unit actuates the switch with a manual actuation and the switch opens the door lock as a result of the actuation. In other words: The carrier unit is designed to unlock the door lock and/or the vehicle when an object situated in a detection area of the sensor and/or an object approaching the detection area is detected, the actuating unit being designed to press the switch when actuated manually. Pressing the switch triggers an opening of the door lock. In the process, the actuated switch generates an opening signal which is transmitted to the door lock. The door lock may therefore be unlocked in a contact-free manner. For example, the door lock is unlocked when the sensor is approached. In an unlocked state of the door lock, the switch is then active, for example. When the actuating unit is actuated, for example, by a force applied to the actuating unit, the actuating unit presses and actuates the switch. As a result of this actuation of the switch, the door lock is opened electrically. A user may then move the movable vehicle element relative to a vehicle body. The handle element is, for example, rigidly arranged on the vehicle, in particular, on the movable vehicle element. Alternatively, the handle element is pivotally mounted on the vehicle, in particular, on the movable vehicle element.

The advantages achieved with the invention are, in particular, that such a door handle arrangement enables an actuation of an electrically opening door lock, in particular, a side door lock, via a short-stroke actuation within the door handle arrangement. In this case, the expenditure of force for opening the movable vehicle element is reduced compared to a vehicle element known from the prior art having a key-lock door handle arrangement. The door lock is arranged, for example, in or on the movable vehicle element. The movable vehicle element is, for example, a vehicle door, in particular, a vehicle side door, a tailgate or an engine hood.

Furthermore, a comparatively quick and simplified unlocking of the door lock is made possible for a user. For example, the object is a hand or a finger of the user. A keyless unlocking of the door lock, in particular, is made possible. In this case, an expenditure of time and effort is reduced if a search for a key to unlock the door lock is avoided. Furthermore, an intuitive opening of the movable vehicle element is made possible.

In addition, an installation space for the door handle arrangement is essentially reduced, for example by eliminating a key-lock function in a handle area of the movable vehicle element. A visual appearance of the movable vehicle element is also improved by eliminating a keyhole.

The carrier unit is designed, for example, to activate the detection area when a person approaching and authorized to access the vehicle is detected. For example, the person authorized to access carries a transponder to transmit an access authorization to the vehicle. The carrier unit is also designed to activate the switch when the person authorized to access and approaching the vehicle is detected, so that it may be actuated by the actuating unit.

The carrier unit carries, for example, a capacitive locking sensor system, a capacitive unlocking sensor system and switching electronics for opening the door lock. The carrier unit enables a compact design of a combined sensor system and electronics. Both the capacitive locking sensor system, the capacitive unlocking sensor system as well as the switching electronics, in particular, are arranged in a handle that may be grasped by a user. Upon detection of an object approaching the detection area and/or upon detection of an object located in the detection area of the sensor, the carrier unit, in particular the sensor, receives an instruction to unlock the door lock and/or vehicle. The sensor may also be configured to detect a touch of the object on the actuating unit.

The door handle arrangement according to the invention is a door handle system, which provides a switch actuation as a control actuation in connection with a capacitive locking and unlocking sensor system. For example, the door handle arrangement according to the invention comprises an essentially fixed door handle for a user, consisting at least of the handle cover and the actuating unit. The movable vehicle element may be opened with comparatively little effort.

According to one embodiment, the handle element is arranged in a door recess of the movable vehicle element, in particular, of a vehicle side door. The handle element is arranged, for example, on the movable vehicle element by means of a hinge. For example, the handle element is articulately mounted on the movable vehicle element and designed to allow a larger total stroke, for example for an empty travel, before the actuating unit or an element actuating the switch or part of the actuating unit, for example, in the form of an actuating flap, engages the switch or button. This improves the haptics for the user. Furthermore, the handle element may be pivotally mounted on the movable vehicle element by means of the hinge, the handle element being actuatable manually, in particular pivotable, with a high actuation stroke and/or a greater effort to open the movable vehicle element, in the event of an emergency actuation, for example in the event of an accident or in the event of an electronic system malfunction. For example, the handle element for opening the door lock may then be actuated with a larger actuation stroke of, for example, up to 30 mm.

In one refinement, the carrier unit comprises a trigger element. In the unactuated state and in the unopened state of the door lock, for example, the trigger element is spaced apart from the sensor. The switch, for example, is designed as a trigger element. The trigger element is, for example, largely elastically deformable. For example, the trigger element is a sheet of metal, for example a sheet metal tongue or sheet metal tab. In this case, the trigger element when subjected to force, i.e., upon an actuation triggered by the actuating unit, may be elastically deformed. The trigger element is deformed and/or moved in a certain area in the direction of the sensor, so that a distance between this area of the trigger element and the sensor changes. The trigger element may be formed from a non-metallic, elastically deformable material. For example, the trigger element extends essentially semicircularly above the sensor with, for example, a distance between the trigger element and the sensor and/or carrier unit being greatest in a center of the trigger element. The trigger element may also be circular, for example annular. In another variant, a spacer is arranged between a surface that may be contacted or is contacted with the actuating unit and a surface that faces the sensor. The center of the trigger element, for example, is aligned in the direction of the actuating unit. A deformation and/or movement of the trigger element when force is applied, in particular, when the actuating element is actuated, takes place in the direction of the sensor in a micrometer to millimeter range, for example between 0.1 millimeters and 10 micrometers. A change in distance results from the elastic deformation and/or movement. Another sensor or the sensor is designed to detect a change in distance when the switch or the trigger element is actuated. The sensor detects, in particular, a change in a distance between the trigger element and the sensor. When the trigger element is actuated, the sensor detects a change in distance between the trigger element and the sensor, whereupon the sensor opens the door lock as a result of the detected change in distance. In this variant, the opening signal is generated indirectly by the switch. For example, the sensor generates a signal when an actuation of the trigger element is detected, in particular, when the trigger element moves into a detection range of the sensor due to the change in distance. In this case, the sensor behaves similarly to a fixed electrode, in particular a measuring electrode, and the trigger element behaves similarly to a movable electrode, in particular a reference electrode. The carrier unit may, for example, comprise an evaluation unit and/or be coupled to one. The evaluation unit evaluates the sensor signal and transmits an opening signal to a door opening mechanism. The evaluation unit in this case ascertains a reduction in distance between the triggering element and the sensor based on the change in distance detected by the sensor.

The handle recess rests flush with the door recess. The handle recess at least is covered on the outside by means of the handle cover. The handle element is designed as an outer handle and has an inner, actuatable handle surface. The handle surface, for example, is formed on a side of the actuating unit situated in the handle recess.

In one possible embodiment, the carrier unit is arranged on an inside of the handle cover. For example, the carrier unit is arranged between the handle element and the handle recess. The carrier unit is arranged, in particular, between the actuating unit and the handle cover. When the actuating unit is actuated, the actuating unit is pushed in the direction of the carrier unit. The carrier unit, for example, is attached to the handle cover by means of a hold-down device. In other words: The actuating unit is pushed towards the user during manual actuation. The actuating unit, the carrier unit and the handle cover, for example, together form an outer door handle. The outer door handle is, for example, a partially open, fixed door handle.

The door handle assembly, for example, comprises a handle support that includes the actuating unit, the carrier unit, and the handle cover.

In a further possible embodiment, the detection area extends at least over a section of the handle recess. For example, the detection area of the sensor is directed into the handle recess. When the user reaches with his hand or his fingers into the handle recess, the hand or fingers are situated in the detection area, whereupon the carrier unit then unlocks the door lock. At the same time, the hand or finger of the user is situated in a position provided for actuating the actuating unit in the handle recess provided for this purpose. In other words: the door handle arrangement enables a sequential unlocking and opening by a sensor, in particular, by a proximity sensor, and a mechanical switch, whereby an approach of a hand into a handle area is detected, the vehicle and/or door lock is unlocked and only when the internal actuator is actuated, i.e., actuation of the mechanical switch, is the door lock opened.

The actuating unit comprises a partially open actuating area, which is situated at least partially in the handle recess. The actuating area is, for example, open towards the bottom. The user may insert his hand and/or fingers into the actuating area from bottom to top in a simple manner. The detection area and the actuating unit may be reached by the user within the actuating area. The detection area is directed into the actuating area. The actuating unit has, for example, a surface adjacent to and/or in the detection area.

According to a further embodiment, the sensor is an electronic sensor, in particular a capacitive sensor. The electronic sensor, for example, is a proximity sensor. The capacitive sensor, for example, enables a contactless detection of an approaching object and/or of an object located in the detection region. Alternatively or additionally, the carrier unit comprises an electronic actuator, for example, a touch sensor, contact sensor and/or touch switch.

According to one refinement, the carrier unit is coupled to a locking mechanism of the door lock. If a hand of the user is situated in the detection area, the carrier unit unlocks the locking mechanism of the door lock. The carrier unit is coupled, for example, to the locking mechanism via lock electronics. The carrier unit in this case is coupled by means of signals to the lock electronics. For example, a signal generated in the detection area when the object, in particular a hand of the user, is detected, is transmitted to the lock electronics and the locking mechanism is unlocked, for example, by means of an actuator. The locking mechanism and the lock electronics are arranged and mounted, for example, in the movable vehicle element, in particular in the vehicle door.

Another possible embodiment provides that the carrier unit is at least one carrier plate. The carrier unit, for example, comprises a printed circuit board (PCB), which is provided with the switch, in particular a micro-switch or micro-push button, in the direction of the actuating unit. A number of the switches in this case may vary depending on the dimensions of the circuit board and/or the actuating unit and/or the handle cover. The switch is, in particular, an actuating switch or opening switch. The circuit board, for example, is attached to the handle cover by means of a hold-down device. The door handle arrangement thus includes integrated handle electronics for opening the door lock, in particular, a so-called E-lock. The circuit board is also equipped with a capacitive locking and unlocking sensor system. When the switch is actuated by the actuating unit, a signal, for example, is sent electrically to a lock electronics, which opens the door lock, for example, by means of a motor. The switch and the lock electronics in this case are coupled to one another by signals. The lock electronics are arranged and mounted, for example, in the movable vehicle element, in particular, in the vehicle door. By pulling on the rigid or pivotable handle element, it is then possible to open the movable vehicle element, in particular, the vehicle door.

In one refinement, the actuating unit is designed in the form of an actuating flap, which is relatively movable with respect to the carrier unit. When the actuating flap is actuated manually, it is pushed in the direction of the handle cover and thus in the direction of the carrier unit and the at least one switch. When the actuating flap is actuated, it pushes against the switch and actuates it in a safe manner. Such an actuating flap allows for a particularly small actuation stroke of the actuating unit, for example, of less than 3 mm. The actuating flap, for example, forms the handle surface for a user. The actuating flap is arranged essentially in and/or on the detection area. For example, the actuating flap is arranged downstream from the detection area. As a result, the actuating unit for opening the door lock and the vehicle door may be actuated in a simple manner, the user having previously inserted his hand and/or fingers into the detection area for unlocking the door lock. The actuating flap is designed, for example, to be spring-loaded, as a result of which the actuating flap is moved back into an initial position after a manual actuation.

The switch may be actuated by slightly pivoting the actuating unit relative to the handle cover, which is arranged, in particular fixedly, on the handle element. The actuating unit, for example, has a hinge that is mounted on the handle element via a hinge shaft. The handle element comprises, for example, a return spring, which holds the actuating unit on the handle element and after pivoting returns it to its initial position. In the initial position, the actuating unit is arranged spaced apart from the switch.

Another embodiment provides that the handle element comprises a cover support. The actuating unit, for example, is part of the cover support. The cover support, for example, mounted on the handle element in an articulated manner, is designed to allow a larger overall stroke, for example for an empty travel, before the actuating unit or an element actuating the switch or part of the actuating unit, for example in the form of an actuating flap, comes to rest on the switch or button. In this case, the cover support comprises a hinge which is mounted on the handle element via a hinge shaft. For example, the hinge of the cover support and/or the actuating unit corresponds to the hinge of the handle element and has a common pivot axis. The actuating flap of the actuating unit, for example, is arranged in a pivotable manner on the cover support. The cover support may be easily pivoted in relation to the handle element. Due to the spring action of the return spring, the cover support is returned to its initial position when the actuation is released. The return spring, for example, exhibits a restoring force of 70 N. The return spring is also provided to compensate for an actuating force applied to the cover support, the switch being safely protected against mechanical stress, for example, as a result of excessive lifting/compressive force exerted by the user. In one refinement, the return spring holds the carrier unit essentially fixed relative to the handle recess. The cover support is also a handle holder, for example.

By selecting an appropriate switch, it is possible, in addition to opening the door lock, to trigger actuation feedback, for example in the form of haptic and/or acoustic feedback, for example, by means of vibration on the actuating unit and/or via a loudspeaker.

In addition, an end stop may be provided, which limits an actuation of the actuating unit. As a result, the switch is safely protected against mechanical stress, for example, due to excessive actuation.

According to one possible refinement, the handle cover and the carrier unit are arranged on the cover support. The cover support includes, for example, a recess in which the carrier unit is accommodated and held. In addition, the cover support has a fastening area for fastening the handle cover to the cover support. The handle cover, for example, includes fastening hooks or other suitable elements as fastening elements for a form-fitting or force-locking connection. The cover support further comprises an actuating flap for actuating the switch of the carrier unit.

One possible additional embodiment provides that an additional sensor is provided for an additional detection area. The additional sensor is arranged, in particular, in the area of the handle cover. The additional detection area in this case is located, for example, on an outer side of the handle cover. The additional detection area, for example, extends over a section of the outside. The additional sensor is designed to lock the door lock when an object located in the additional detection area is detected. The carrier unit, for example, is coupled to the additional, in particular electronic, sensor. The additional electronic sensor for locking the door lock is arranged, for example, between the handle cover and the hold-down device or the carrier unit. The additional sensor is arranged, in particular, on an inside of the handle cover. The hold-down device is therefore provided on both sides with at least one sensor and/or one carrier unit each. In other words: The additional detection area for locking the door lock is not situated in the handle recess. The additional detection area is directed into a vehicle surroundings and is therefore easily accessible to the user. This makes it possible to easily and rapidly lock the door lock. The additional detection area is directed into a surroundings of the movable vehicle element and/or of the vehicle.

The invention further relates to a movable vehicle element for a vehicle, including at least one door lock and a door handle arrangement according to the preceding description. The movable vehicle element is, in particular, a vehicle door, for example a vehicle side door, a tailgate or engine hood.

Figure 2:
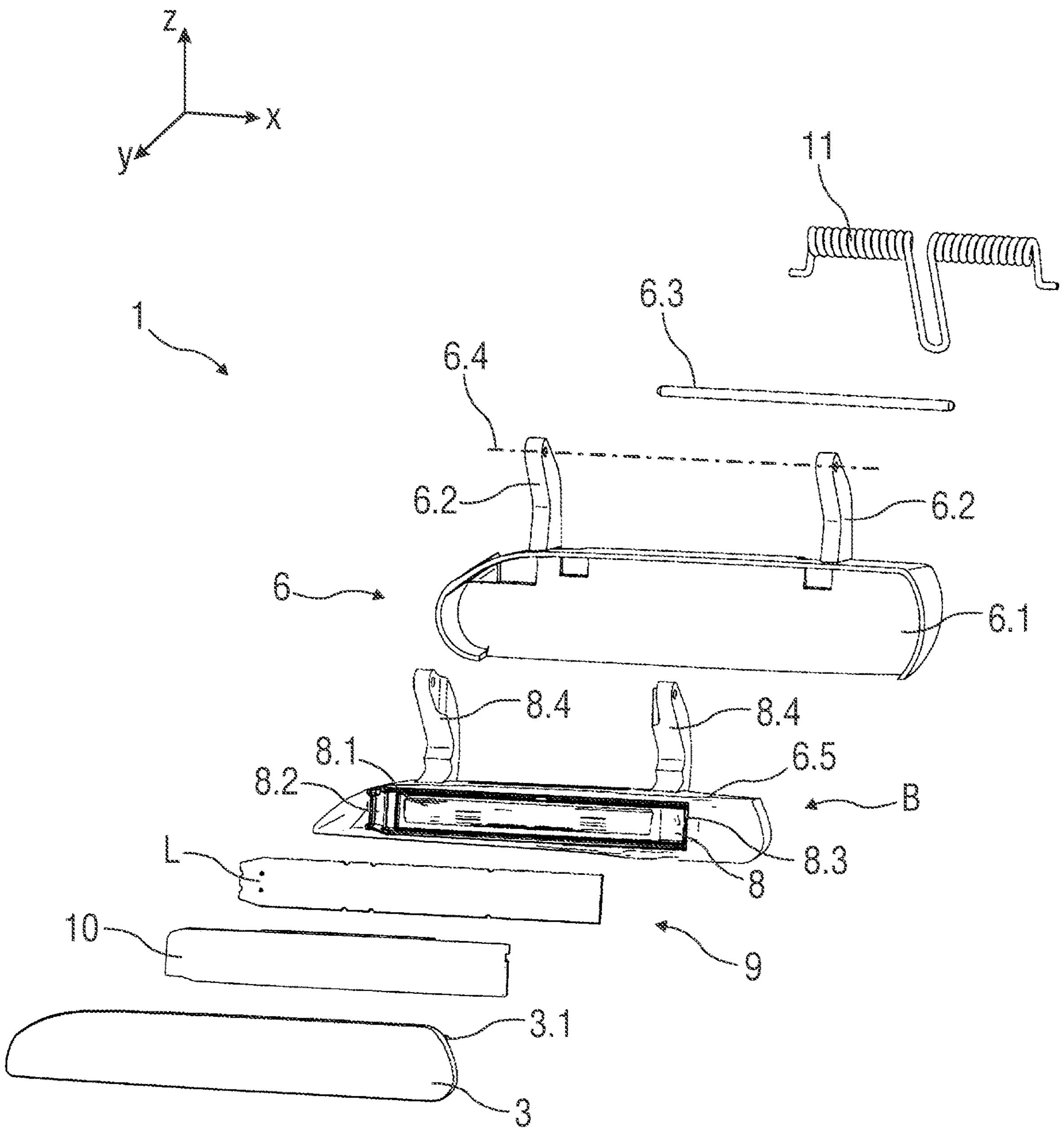
Figure 3:
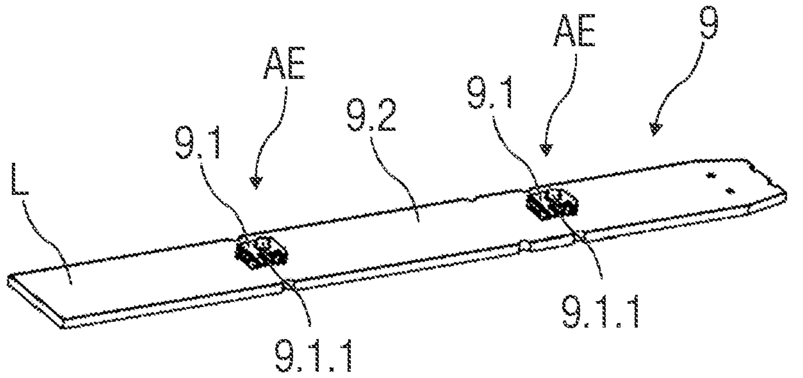
Figure 4:
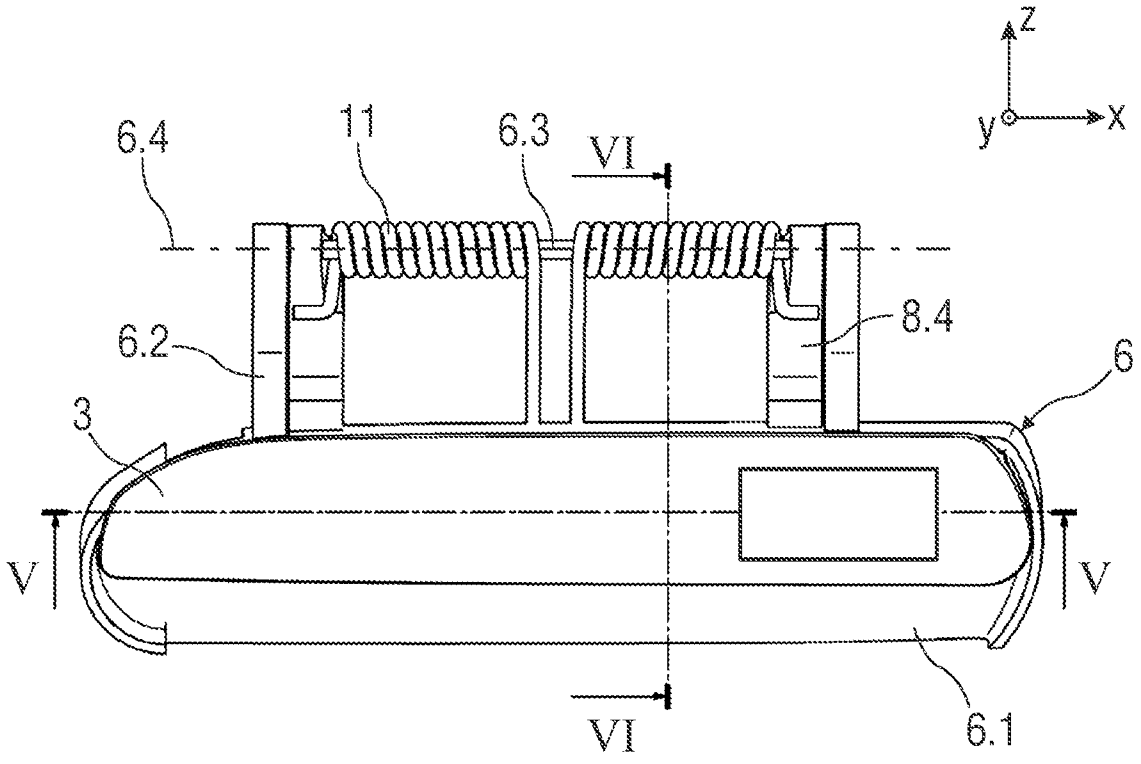
Figure 5:
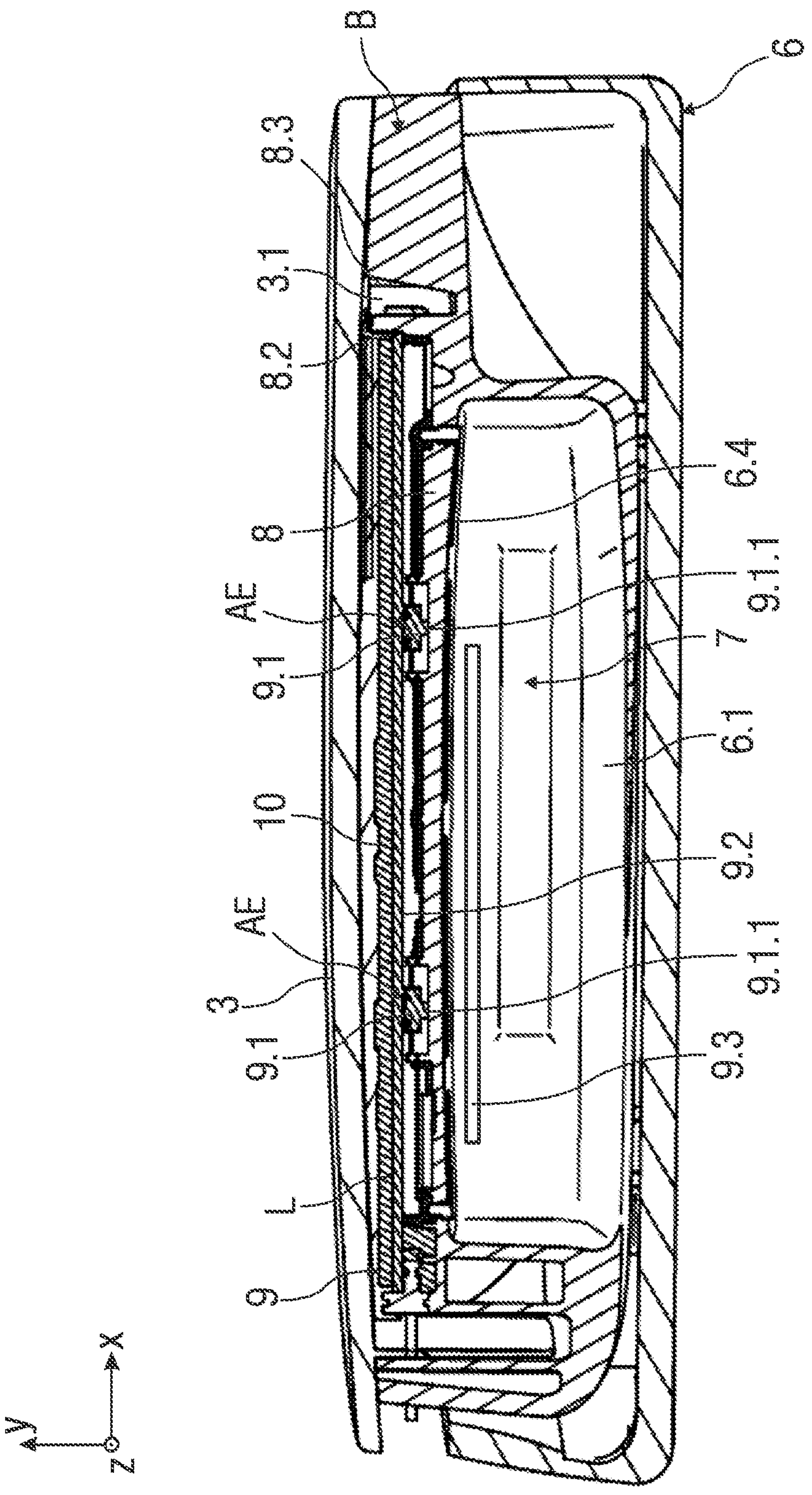
Figure 6A:
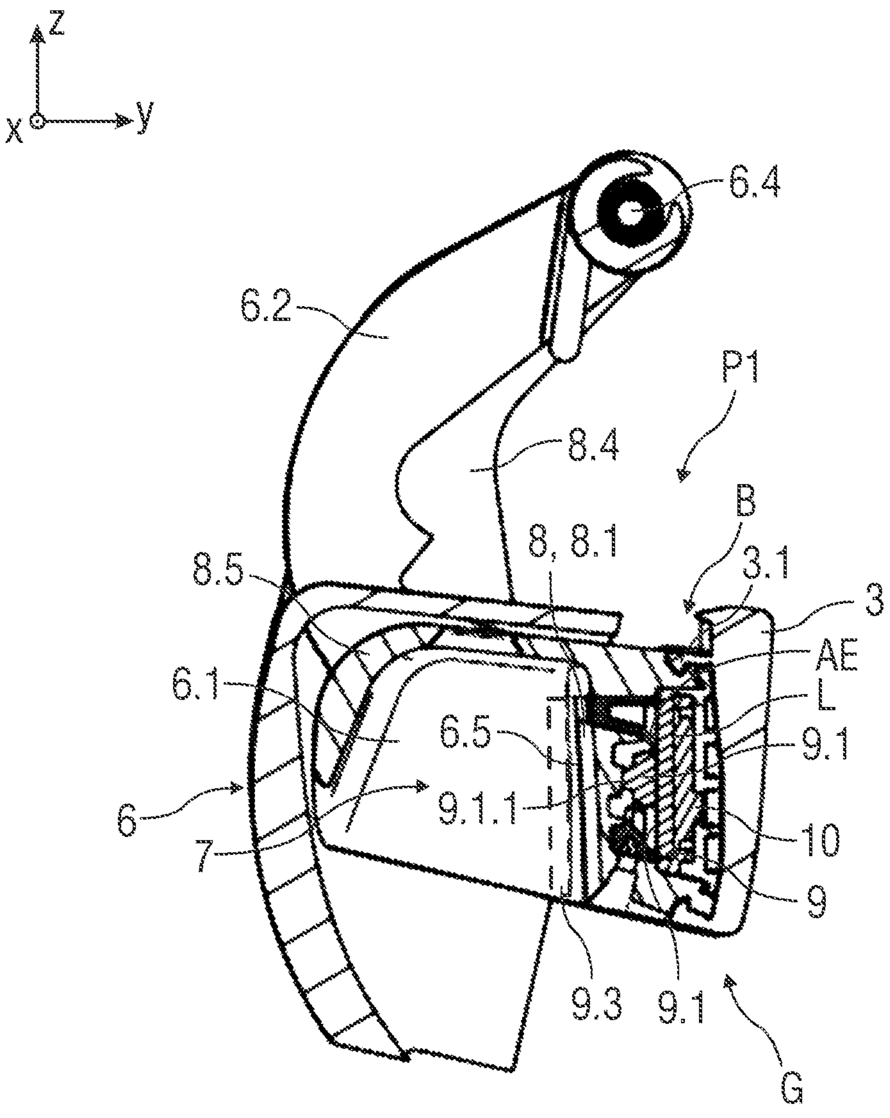
Figure 6B:
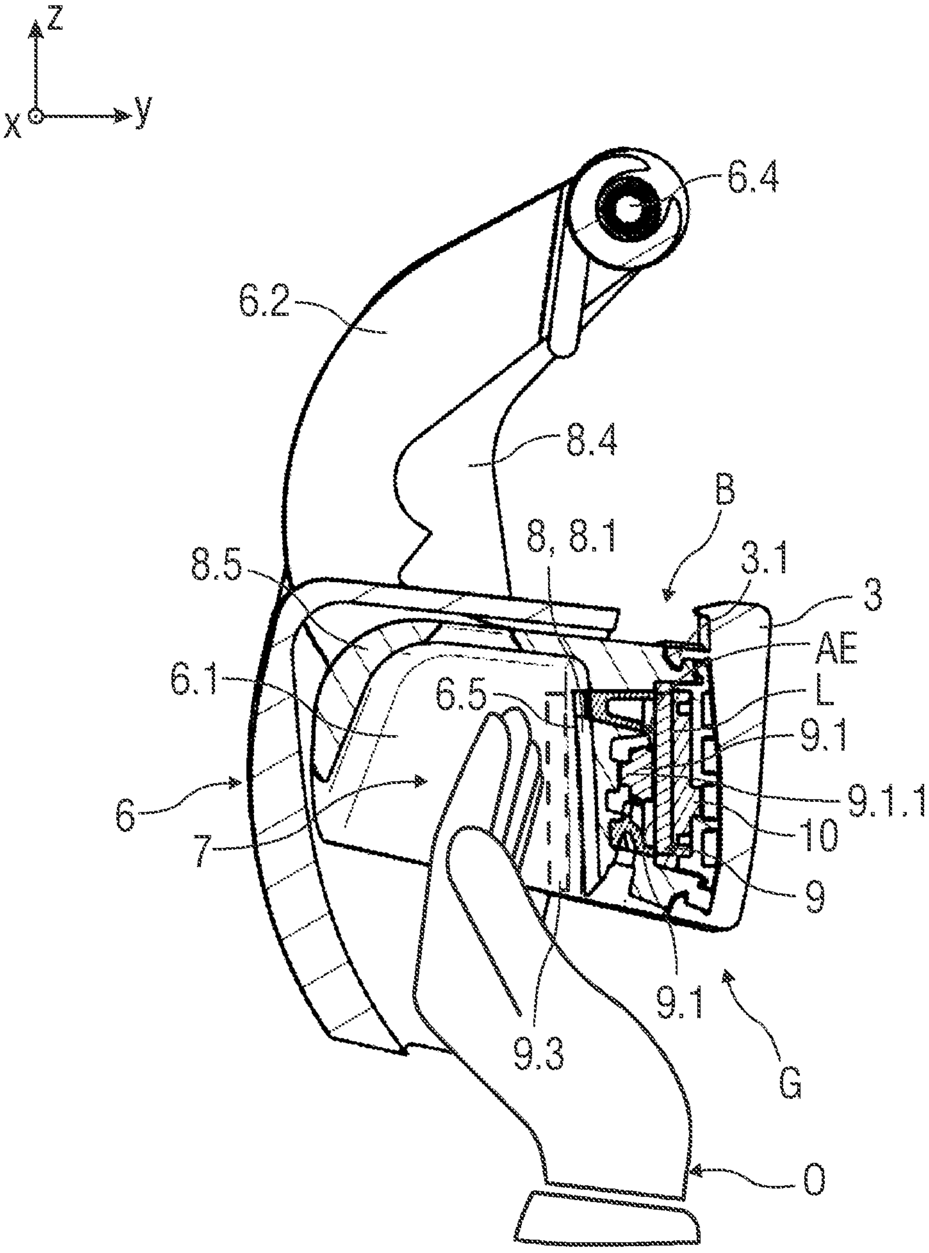
Figure 6C:
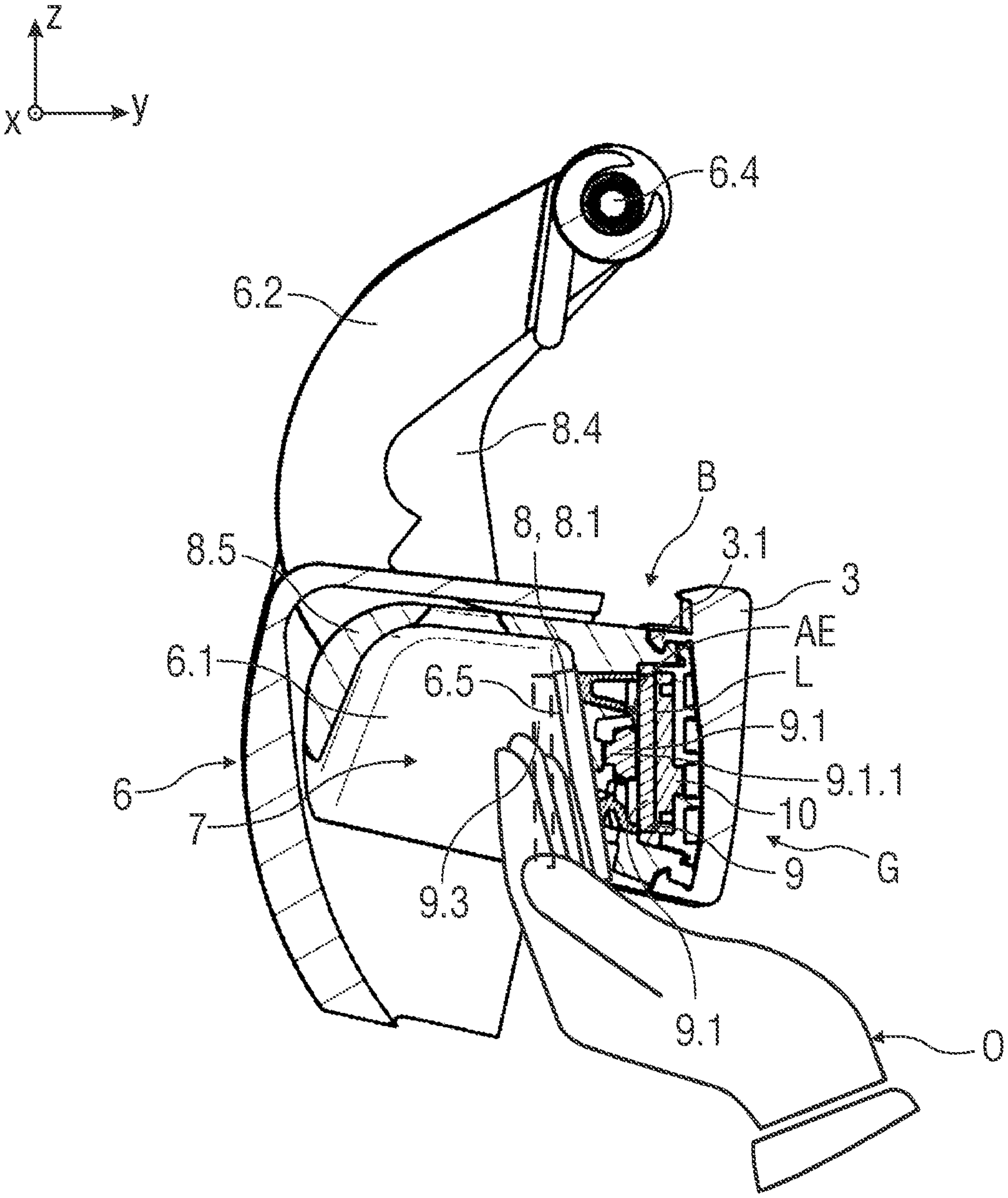
Figure 7A:
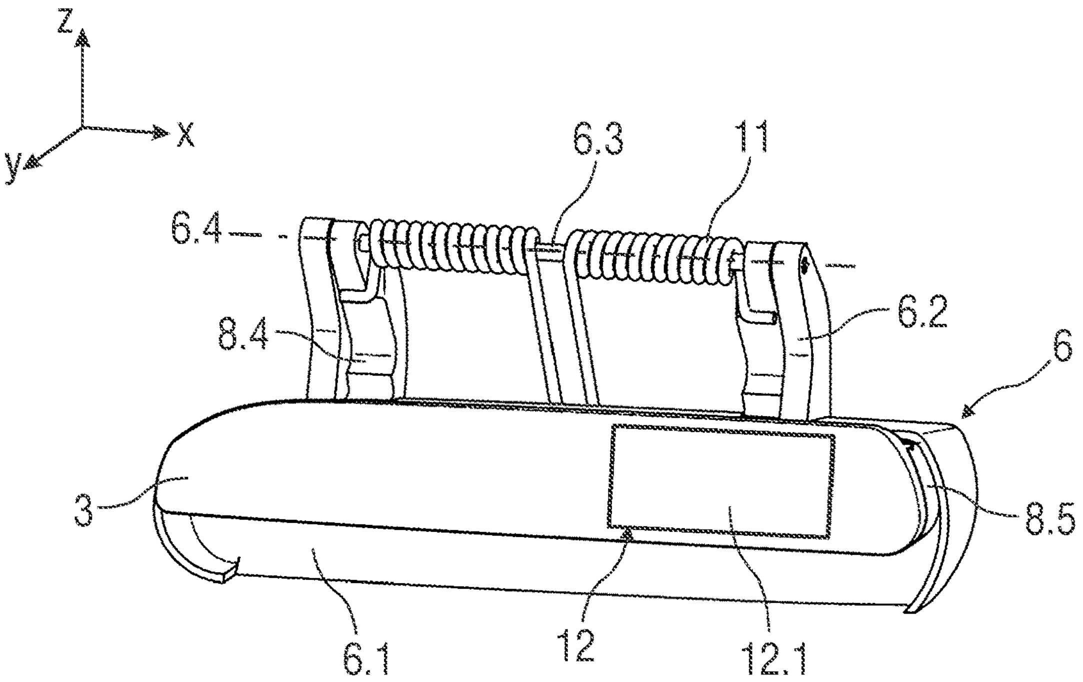
Figure 7B:
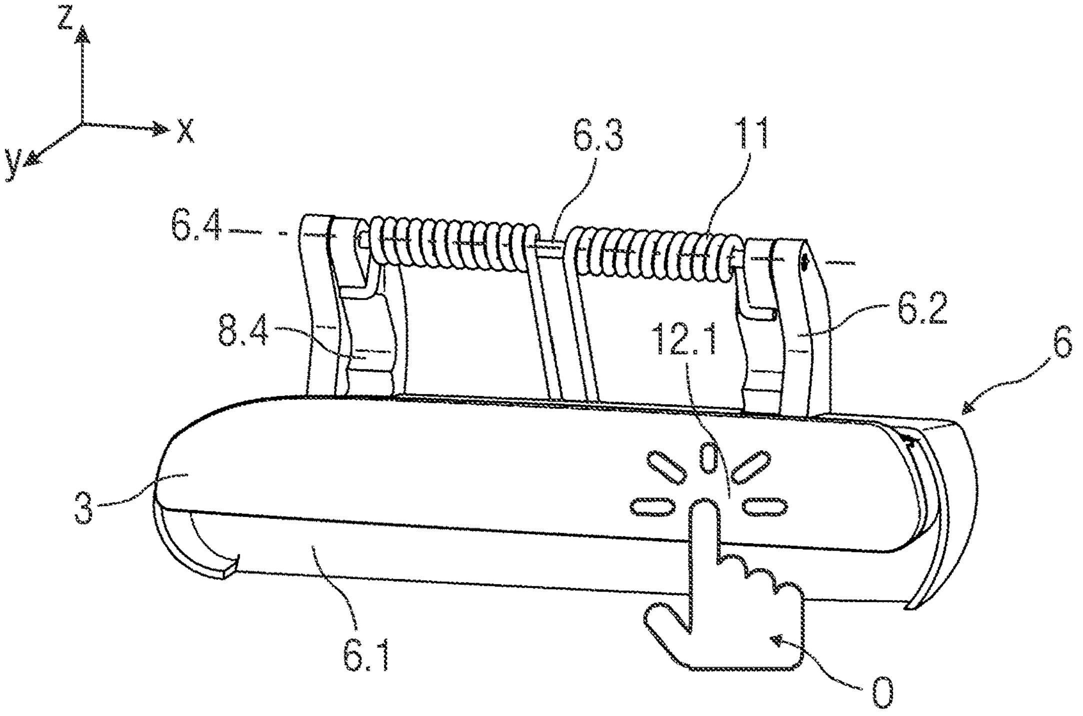
Figure 8:
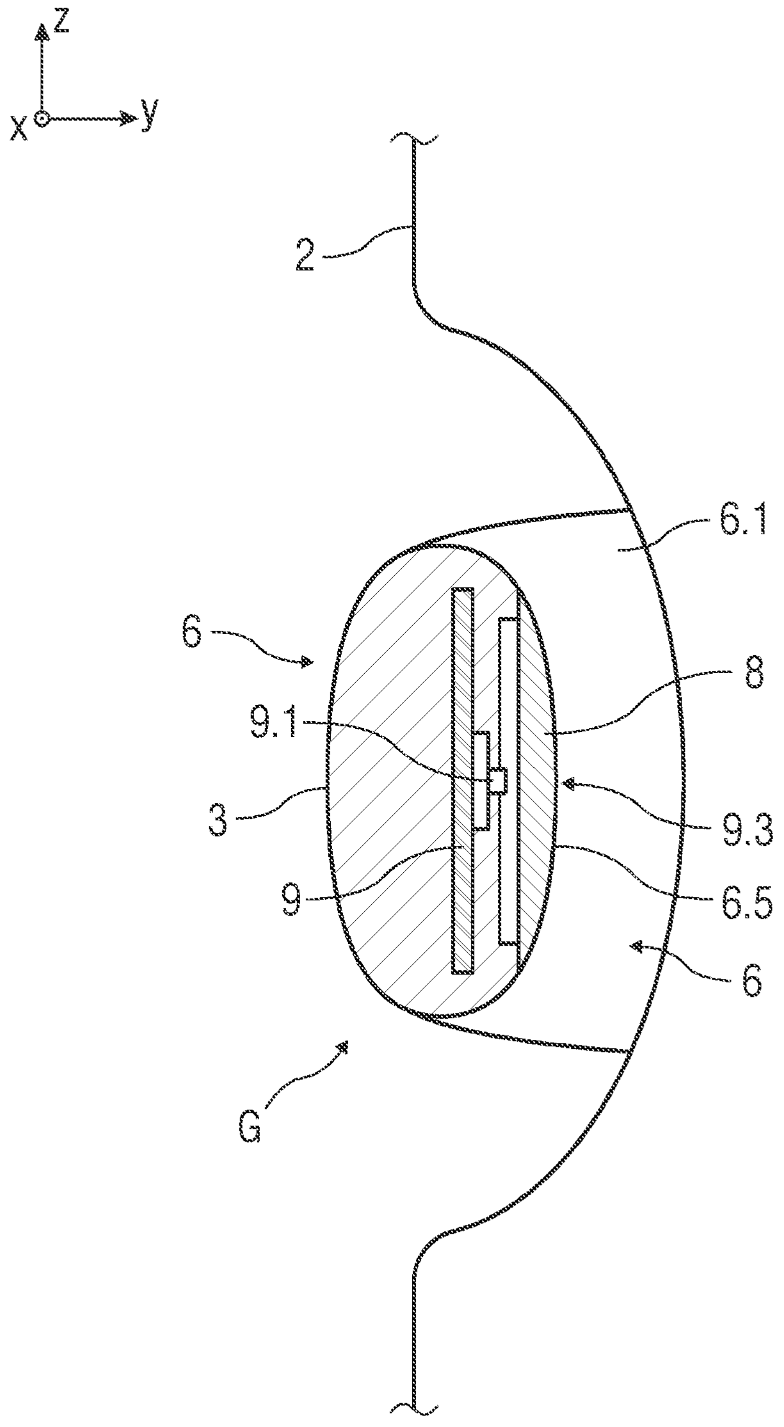

Exemplary embodiments of the invention are explained in greater detail with reference to drawings, in which:

FIG. 1 schematically shows an exemplary embodiment of a door handle arrangement for a movable vehicle element of a vehicle in a top view, FIG. 2 schematically shows an exploded view of an embodiment of a door handle arrangement, FIG. 3 schematically shows an exemplary embodiment of a component of the door handle arrangement in a perspective view, FIG. 4 schematically shows an exemplary embodiment of a door handle arrangement in a top view, FIG. 5 schematically shows an exemplary embodiment of the door handle arrangement according to FIG. 4 in a view from below, FIG. 6A schematically shows a sectional representation of the door handle arrangement according to FIG. 4, FIGS. 6B and 6C schematically show an actuation sequence of the door handle arrangement for opening a movable vehicle element, FIGS. 7A and 7B schematically show another exemplary embodiment of a door handle assembly for locking a movable vehicle element, and FIG. 8 schematically shows a sectional representation of a door handle arrangement arranged on a movable vehicle element, in particular, on a vehicle side door.

Corresponding parts are provided with the same reference numerals in all figures.

FIG. 1 schematically shows an exemplary embodiment of a door handle assembly 1 for a movable vehicle element 2 of a vehicle, not shown in greater detail in a top view. The door handle arrangement 1 is, in particular, an outer door handle arrangement. The movable vehicle element 2 is, for example, a vehicle side door.

For a better understanding of the design of the door handle arrangement 1, a coordinate system is shown, comprising a longitudinal axis x, a transverse axis y and a vertical axis z with respect to the movable vehicle element 2 designed as a vehicle side door.

The door handle arrangement 1 has a handle cover 3. The handle cover 3 is formed, for example, from a plastic material and, for example, coated with a lacquer or chrome material. The movable vehicle element 2 has a door recess 4, in which the door handle arrangement 1 is arranged.

The movable vehicle element 2 also comprises a door lock 5. The door lock 5 comprises, for example, lock electronics and a locking mechanism. For example, the door lock 5 is a so-called E-lock, in particular an E-side door lock. The door handle arrangement 1 is designed, in particular, to enable a simplified opening of an, in particular, electromechanical door lock 5.

FIG. 2 schematically shows an exploded view of an embodiment of a door handle arrangement 1.

The door handle arrangement 1 comprises a handle element 6. The handle element 6 has a handle recess 6.1. The handle element 6 is, for example, pivotably mounted on the movable vehicle element 2 in the door recess 4 by means of a hinge 6.2, in particular, a swivel hinge. The hinge 6.2 comprises a hinge shaft 6.3, which is pivotally held on the movable vehicle element 2, for example, in the door recess 4. The hinge shaft 6.3 in this case forms a pivot axis 6.4 of the handle element 6.

Alternatively, the handle element 6 may be arranged rigidly on the movable vehicle element 2. In this embodiment, the hinge 6.2 is omitted. In another alternative, the handle element 6 may be mounted on the movable vehicle element 2 by means of the hinge 6.2, wherein the handle element 6 is pivotable only in the event of an emergency actuation, for example, in the event of an accident or of an electronics malfunction, actuatable manually with a high actuation stroke and/or a greater effort for opening the movable vehicle element 2.

The handle recess 6.1 is partially covered to the outside by a handle cover 3. The handle recess 6.1 is provided to form an actuating area 7, as shown in FIGS. 5 to 6C, for a user of the vehicle. The handle recess 6.1 closes, for example, flush with the door recess 4. The actuating area 7 is formed by the handle recess 6.1. The user is able to guide his hand and/or fingers into the actuating area 7 in order to initiate an unlocking and an opening of the movable vehicle element 2.

The door handle arrangement 1 further comprises at least one actuating unit 8, which is arranged between the handle element 6 and the handle cover 3.

The handle element 6 is designed as an outer handle and has an inner, actuatable handle surface 6.5. The surface of the actuating unit 8 pointing in the direction of the handle recess 6.1 may form the actuatable handle surface 6.5. In particular, the actuating unit 8 is arranged spaced apart from the handle element 6, so that the handle recess 6.1 and the handle surface 6.5 are accessible to the user.

To form the door handle arrangement 1 including integrated switching electronics for opening a so-called E-lock of the movable vehicle element 2, the actuating unit 8 is arranged between the handle element 6 and the handle cover 3.

The door handle arrangement 1 further comprises at least one carrier unit 9, which forms the switching electronics, in particular, handle electronics. The carrier unit 9 is arranged between the actuating unit 8 and the handle cover 3. A hold-down device 10, for example, is located between the handle cover 3 and the carrier unit 9 for holding the carrier unit 9 on the handle cover 3. The carrier unit 9 comprises a fitted printed circuit board L and is coupled, for example, to the door lock 5, in particular, to its lock electronics. The carrier unit 9 comprises two switches 9.1 which may be actuated by the actuating unit 8, as shown in FIG. 3. The switches 9.1 are, in particular, micro-switches. The carrier unit 9 is provided, in particular, with the switches 9.1 in the direction of the actuating unit 8.

Such a door handle arrangement 1 including an internal actuating unit 8 and carrier unit 9 for actuating the switches 9.1 makes possible a particularly compact door handle that includes integrated handle electronics, in particular sensor/actuating electronics, for example, for an electronic door lock 5. The actuating unit 8, when it is actuated manually, actuates the switch 9.1, as a result of which a door opening, in particular a door lock opening, is initiated. For example, the actuating unit 8 is designed to press the switch 9.1 during manual actuation, as a result of which the door lock 5 is opened.

The actuating unit 8 is designed in the form of an actuating flap 8.1, which is pivotable relatively in the direction of the carrier unit 9. The actuating unit 8 is, for example, part of a cover support B and/or, for example, a handle support. The cover support B is designed to hold the handle cover 3 and the carrier unit 9 on the handle element 6. The cover support B comprises a cutout 8.2, in which the carrier unit 9 is accommodated and held. In addition, the cover support B includes mounting units 8.3 for fastening the handle cover 3 to the cover support B. The handle cover 3, for example, comprises as fastening elements 3.1 locking hooks or other suitable elements for a form-fitting or friction-locking connection. The cover support B and the actuating unit 8, for example, are formed in one piece, for example, as a two-component part. The actuating flap 8.1 is, for example, elastically formed on the cover support B. The actuating unit 8, for example, comprises a body section 8.5, which is open at the bottom. In one refinement, the body section 8.5 is part of the cover support B. The cover support B forms the actuating area 7.

The body section 8.5, for example, is essentially U-shaped in cross section. The body section 8.5 forms the actuating area 7 in the open area. The body section 8.5 is partially or completely arranged in the handle recess 6.1. The detection area 9.3 is directed into the actuation area 7. The actuating flap 8.1 is arranged within the body section 8.5. The actuating flap 8.1 forms, for example, a closed side of the actuating area 7. The actuating flap 8.1 is arranged, in particular, downstream from the detection area 9.3. The actuating flap 8.1 may be arranged on and/or in the detection area.

The cover support B is, in particular, mounted on the handle element 6 in an articulated manner. For this purpose, the cover support B comprises a hinge 8.4, which is mounted on the handle element 6 via the joint shaft 6.3. The hinge 8.4 of the cover support B and/or of the actuating unit 8, for example, corresponds to the hinge 6.2 of the handle element 6 and has a common pivot axis 6.4. The cover support B may be pivoted easily relative to the handle element 6. Due to the spring action of a return spring 11, the cover support B is returned to its initial position P1 when the actuation is released, as shown in FIG. 6A.

FIG. 3 schematically shows an exemplary embodiment of a component of the door handle arrangement 1 in a perspective view. FIG. 3 shows, in particular, the carrier unit 9 as a component. The switches 9.1 are arranged on one side of the printed circuit board L facing the actuating unit 8. In addition, the carrier unit 9 comprises a capacitive unlocking sensor system for unlocking the door lock 5. For this purpose, the carrier unit 9 is coupled, for example, to the locking mechanism of the door lock 5. The carrier unit 9 comprises, in particular, a sensor 9.2 or a sensor unit. The carrier unit 9 is provided with the sensor 9.2 in the direction of the handle recess 6.1.

FIG. 4 schematically shows an exemplary embodiment of the door handle assembly 1 in a top view.

FIG. 5 schematically shows an exemplary embodiment of the door handle arrangement 1 according to FIG. 4 in a view from below. The carrier unit 9 is designed to unlock the door lock 5 when an object O situated in a detection area 9.3 of the sensor 9.2, for example, a hand and/or fingers of a user, is detected, as shown in FIG. 6B. The actuating unit 8 is designed to press the switches 9.1 during manual actuation, resulting in the opening of the door lock 5. The carrier unit 9, in particular, comprises a combined handle electronics and unlocking sensor system.

In a further possible embodiment, the detection area 9.3 extends at least over a section of the handle recess 6.1. The detection area 9.3 of the sensor 9.2, for example, is directed into the handle recess 6.1. When the user reaches into the handle recess 6.1 with his hand or his fingers, the hand or the fingers are situated in the detection area 9.3, whereupon the carrier unit 9 then unlocks the door lock 5. At the same time, the object O, i.e., the hand or fingers of the user, is situated in a position provided for manually actuating the internal actuating unit 8 in the handle recess 6.1 provided for this purpose.

In one refinement, at least one switch 9.1 is designed as a trigger element AE, an operative connection being produced between the switch 9.1 and the sensor 9.2 when the switch 9.1, in particular, the trigger element AE, is actuated. The trigger element AE, for example, is designed as an electrode that is largely movable and/or deformable relative to the sensor 9.2. The sensor 9.2 is formed by a fixed electrode, for example. When the actuating unit 8 is actuated manually, it presses the trigger element AE and actuates the trigger element AE in such a way that the trigger element AE is moved and/or deformed in the direction of the sensor 9.2. The sensor 9.2 is, for example, a capacitive sensor, which detects a change in distance between the sensor 9.2 and the trigger element AE based on a change in capacitance between the two. The sensor 9.2 and the trigger element AE in this case behave similarly to a plate capacitor. For example, the sensor 9.2 generates a sensor signal as a function of a change in the capacitance, which is evaluated, for example, by an evaluation unit coupled to the carrier unit 9 and/or to the sensor 9.2. The trigger element AE is arranged in a closed state of a door opening mechanism within the door handle arrangement 1 at a predetermined distance from the sensor 9.2. A surface 9.1.1 of the triggering element AE facing the actuating unit 8 is arranged, for example, at a distance from the sensor 9.2, in particular, in a closed state of the door lock 5 and in an unactuated state of the actuating unit 8.

An exemplary sequence of the door opening mechanism is described below: The door lock 5 is locked. A user approaches the vehicle door with the intention of unlocking and opening it. A hand of the user approaches the handle recess 6.1 to unlock the vehicle door, in particular the door lock 5. If at least the user's fingers approach the actuating area 7 or if the user's fingers are situated in the actuating area 7, the sensor 9.2 detects the approach and/or the presence of the user's fingers in its detection area 9.3 by detecting a first change in capacitance, for example, between the trigger element AE and an electrical zero potential. The door lock 5 is then unlocked based on the detected signal of the first change in capacitance. If the user then actuates the actuating unit 8, for example, by exerting pressure on the actuating flap 8.1, the actuating unit 8, in particular, the actuating flap 8.1, exerts pressure on the trigger element AE. The trigger element AE deforms in the direction of the sensor 9.2, which then detects a second change in capacitance and generates a sensor signal, for example, an opening signal. The opening signal is transmitted to the door lock 5, which opens as a result of the received opening signal. The vehicle door may then be opened by the user. The actuating flap 8.1 is moved back to an initial position, for example, by a return element. As a result, pressure no longer acts on the trigger element AE, so that it is also moved back into an initial position.

FIG. 6A schematically shows a sectional representation of the door handle arrangement 1 according to FIG. 4. FIGS. 6B and 6C schematically show an actuating sequence of the door handle arrangement 1 for opening the movable vehicle element 2.

To form the door handle arrangement 1 including integrated electronics (also called handle electronics) for opening a so-called E-lock of the movable vehicle element 2, the actuating unit 8 is arranged between the handle element 6 and the handle cover 3.

The door handle arrangement 1 further comprises at least one carrier unit 9, which forms the handle electronics. The carrier unit 9 is arranged between the actuating unit 8 and the handle cover 3. The carrier unit 9 comprises a fitted printed circuit board L. The carrier unit 9 comprises two switches 9.1 actuatable by the actuating unit 8. The switches 9.1 are, in particular, micro-switches. The switches 9.1 are arranged on one side of the printed circuit board L facing the actuating unit 8. In addition, the carrier unit 9 comprises a capacitive unlocking sensor system for unlocking the door lock 5. The carrier unit 9 comprises, in particular, a sensor 9.2 or a sensor unit. The carrier unit 9 is provided with the sensor 9.2 in the direction of the handle recess 6.1. When not actuated, the actuating unit 8 or the actuating flap 8.1 is arranged spaced apart from the switches 9.1, as shown in FIGS. 6A and 6B.

The carrier unit 9 is designed to unlock the door lock 5 when an object O situated in a detection area 9.3 of the sensor 9.2, for example, a hand and/or fingers of a user, is detected, as shown in FIG. 6B. The detection area 9.3 extends at least over a section of the handle recess 6.1. The detection area 9.3 of the sensor 9.2, for example, is directed into the handle recess 6.1. When the user reaches into the handle recess 6.1 with his hand or his fingers, the hand or the fingers are situated in the detection area 9.3, whereupon the carrier unit 9 then unlocks the door lock 5. At the same time, the object O, i.e., the hand or fingers of the user, is situated in a position provided for manually actuating the internal actuating unit 8 in the handle recess 6.1 provided for this purpose. If the object O, in particular, the hand of the user, is situated in the detection area 9.3, the carrier unit 9 unlocks the locking mechanism of the door lock 5. The carrier unit 9 is coupled, for example, to the locking mechanism via the lock electronics. The carrier unit 9 is coupled by signals to the lock electronics. For example, a signal generated when object O is detected in detection area 9.3 is transmitted to the lock electronics and the locking mechanism is unlocked, for example, by means of an actuator.

The actuating unit 8 is designed to press the switches 9.1 during manual actuation, as a result of which the door lock 5 is opened, as shown in FIG. 6C. When the actuating unit 8 is actuated to open the door lock 5 and the movable vehicle element 2, the actuating unit 8 is pressed in the direction of the handle cover 3 and actuates the switches 9.1. When the switches 9.1 are actuated by the actuating unit 8 or by the actuating flap 8.1, a signal, for example, is sent electrically to a lock electronics, which opens the door lock 5, for example, by means of a motor. The switches 9.1 and the lock electronics are coupled by signals to one another. The movable vehicle element 2, in particular, the vehicle side door, may then be opened by pulling on the rigid or pivotable handle G. The handle G is formed in part by the cover support B and by the handle cover 3. The handle G thus comprises at least the following components of the door handle arrangement 1: The actuating unit 8 or the actuating flap 8.1, the carrier unit 9 and the handle cover 3. Both the capacitive unlocking sensor system and the switching electronics for opening the door lock 5 are, in particular, arranged in the handle G, which the user is able to grasp. When the actuation is released, the actuating unit 8 is then returned to its initial position P1 due to the spring action of the elastic actuating unit 8 or to the actuating flap 8.1.

FIGS. 7A and 7B schematically show a further exemplary embodiment of a door handle arrangement 1 for locking the movable vehicle element 2. An additional sensor 12 is provided, in particular, in the area of the handle cover 3 for an additional detection area 12.1. In this case, the additional detection area 12.1 is situated, for example, on an outside of the handle cover 3. The additional detection area 12.1 extends, for example over an outer section of the handle cover 3. The additional sensor 12 is designed to lock the door lock 5 when an object O situated in the additional detection area 12.1 is detected, as shown in FIG. 7B. The carrier unit 9, for example, is connected to the additional electronic sensor 12. The sensor 12 is, in particular, a micro-switch. The additional electronic sensor 12 for locking the door lock 5 is arranged, for example, between the handle cover 3 and the hold-down device 10 or the carrier unit 9. The additional sensor 12 is arranged, in particular, on an inside of the cover handle 3. The hold-down device 10 may thus be provided on both sides with at least one sensor 9.2, 12 and/or one carrier unit 9. In other words: The additional detection area 12.1 for locking the door lock 5 is not situated in the handle recess 6.1. The additional detection area 12.1 is directed into a vehicle surroundings and is therefore easily accessible to the user. This allows for a simplified and rapid locking of the door lock 5.

FIG. 8 schematically shows a sectional representation of a door handle arrangement 1 arranged on a movable vehicle element 2, in particular, a vehicle side door. FIG. 8 in this case shows the door handle arrangement 1 and the movable vehicle element 2 in a side view. The handle element 6, for example, is formed in two parts. Handle cover 3 and handle element 6 together form, in particular, a handle G. The handle cover 3 is directed outwards. The handle cover 3 thus points to an outside of the vehicle.

LIST OF REFERENCE NUMERALS

1 door handle arrangement
2 movable vehicle element
3 handle cover
3.1 fastening element
4 door recess
5 door lock
6 handle element
6.1 handle recess
6.2 hinge
6.3 hinge shaft
6.4 pivot axis
6.5 handle surface
7 actuating range
8 actuating unit
8.1 actuating flap
8.2 recess
8.3 accommodation unit
8.4 hinge
8.5 body section
9 carrier unit
9.1 switch
9.1.1 surface
9.2 sensor
9.3 detection area
10 hold-down device
11 return spring
12 sensor
12.1 detection area
AE trigger element
B cover holder
G handle
L printed circuit board
O object
P1 initial position
x longitudinal axis
y transverse axis
z vertical axis

The invention claimed is:

1. A door handle arrangement for a vehicle including at least one movable vehicle element, comprising:
- one handle element having a handle recess,
- a handle cover which at least partially covers the handle recess, wherein a body section of an actuating unit separates the handle cover and the handle element to form the handle recess therebetween,
- the actuating unit, which is arranged between the handle element and the handle cover, and
- a carrier unit including at least one sensor and at least one switch, wherein the carrier unit is fixed in a stationary position between the actuating unit and the handle cover, wherein
- the carrier unit unlocks a door lock in a contact-free manner upon contact-free detection of an object situated in a detection area of the sensor and/or of an object approaching the detection area, the detection area is located behind the actuating unit in the handle recess and wherein,
- when the door lock is unlocked, the actuating unit actuates the switch when actuated, whereupon the switch opens the door lock as a result of the actuation, wherein an actuating area of the actuating unit and the detection area of the sensor are directed into the handle recess,
- wherein the actuating unit has a first leg and a second leg, each leg having a base attached to the actuating unit and a connection portion opposite the base, the connection portion having a shaft aperture therethrough,
- wherein the handle element has a first leg and a second leg, each leg having a base attached to the handle element and a connection portion opposite the base, the connection portion having a shaft aperture therethrough, wherein a shaft is located through the shaft apertures of the legs of the handle element and the actuating unit, the shaft providing a common pivot axis for both the handle element and the actuating unit.

2. The door handle arrangement according to claim 1, wherein the actuating unit, when actuated, presses and actuates the switch.

3. The door handle arrangement according to claim 1 or 2, wherein the switch electrically opens the door lock as a result of the actuation.

4. The door handle arrangement according to claim 1, wherein the carrier unit is arranged on an inside of the handle cover.

5. The door handle arrangement according to claim 1, wherein the detection area extends at least over a section of the handle recess.

6. The door handle arrangement according to claim 1, wherein the actuating unit comprises a partially open actuating area.

7. The door handle arrangement according to claim 1, wherein the sensor is an electronic sensor.

8. The door handle arrangement according to claim 1, wherein the carrier unit comprises at least one printed circuit board having the switch, the switch facing in a direction of the actuating unit.

9. The door handle arrangement according to claim 1, wherein the switch is designed as an elastically deformable and/or movable trigger element.

10. The door handle arrangement according to claim 9, wherein the sensor detects a change in distance between the trigger element and the sensor when the trigger element is actuated, whereupon the sensor opens the door lock as a result of the detected change in distance.

11. The door handle arrangement according to claim 1, wherein the actuating unit has an actuating flap, which is relatively movable with respect to the carrier unit.

12. The door handle arrangement according to claim 11, wherein the actuating flap is arranged on and/or in the detection area.

13. The door handle arrangement according to claim 1, wherein the handle element comprises a cover support.

14. The door handle arrangement according to claim 1, wherein the actuating unit is part of a cover support.

15. The door handle arrangement according to claim 1, wherein the handle cover and the carrier unit are arranged on a cover support.

16. The door handle arrangement according to claim 1, wherein an additional sensor is provided for an additional detection area in the area of the handle cover, the additional sensor being designed to lock the door lock upon detection of an object situated in the additional detection area.

* * * * *